United States Patent Office 3,429,903
Patented Feb. 25, 1969

3,429,903
METHOD OF PREPARING MOLYBDENUM (III) ACETYLACETONATE
Melvin L. Larson, Royal Oak, Mich., assignor to American Metal Climax, Inc., New York, N.Y., a corporation of New York
No Drawing. Continuation of application Ser. No. 304,236, Aug. 23, 1963. This application Mar. 12, 1968, Ser. No. 712,574
U.S. Cl. 260—429  6 Claims
Int. Cl. C07f 11/00

ABSTRACT OF THE DISCLOSURE

A method of making molybdenum (III) acetylacetonate which comprises the steps of interreacting an alkali hydroxide with acetylacetone in an aqueous solution in which the mole ratio of the alkali hydroxide to the acetylacetone is controlled to a level less than one, and thereafter interreacting trivalent molybdenum ions with said aqueous solution in an amount to provide a concentration of about one atom equivalent of molybdenum for about 3.5 to about 6 moles acetylacetone and about 1 up to 3 moles of said alkali hydroxide present. The resulting compound has utility as a catalyst for various processes.

---

This application is a continuation of application Ser. No. 304,236, filed Aug. 23, 1963, and now abandoned.

The present invention broadly relates to organometallic compounds, and more particularly to an improved method of synthesizing molybdenum (III) beta-diketone complexes of which molybdenum (III) acetylacetonate and substituted acetylacetonates constitute the preferred reaction products.

Organometallic compounds and particular organo molybdenum compounds of the general types of which the method comprising the present invention is applicable possess catalytic characteristics which make them adaptable for use as catalysts in various homogeneous solutions for polymerization, oxidation, hydrogenation, amination, hydration, or epoxidation reactions, for example, which are of increasing importance in the chemical processing and petro-chemical industries. Molybdenum (III) beta-diketone complexes have heretofore been synthesized employing laboratory techniques and starting materials which are not readily adaptable for providing an economical, high volume commercial process.

It is accordingly a principal object of the present invention to provide an improved method for synthesizing and isolating molybdenum (III) beta-diketone complexes which is commercially practicable and yields the compounds in substantially high percentages.

The family of trivalent molybdenum beta-diketone complexes which can be satisfactorily synthesized and isolated in accordance with the process comprising the present invention, is predicated in the control reaction between an aqueous solution containing trivalent molybdenum ions and beta-diketone compounds corresponding to the following formula:

$$R_1-CO-CH_2-CO-R_2$$

in which $R_1$ and $R_2$ are radicals selected from the group consisting of alkyl radicals having 1 to 8 carbon atoms, aryl radicals including phenyl, alkyl substituted aryls wherein the alkyl substituents thereon have 1 to 8 carbon atoms, the halogen substituted alkyl, aryl and alkyl-aryl derivatives thereof, as well as mixtures thereof.

Of the foregoing family of beta-diketone compounds usable in accordance with the method comprising the present invention, acetylacetone in which $R_1$ and $R_2$ correspond to the methyl radical constitutes the preferred material forming molybdenum (III) acetylacetonate. The reaction of acetylacetone in aqueous solution with trivalent molybdenum ions is exemplary of corresponding reactions between other beta-diketone compounds or mixtures of the beta-diketone compounds with trivalent molybdenum ions in aqueous solution forming the corresponding molybdenum (III) beta-diketone complex. Accordingly, while the process comprising the present invention will be described in detail particularly in connection with the synthesis of trivalent molybdenum acetylacetonate, it will be understood that the principals therein employed are equally applicable to the synthesis of other trivalent molybdenum complexes employing the alternative beta-diketone compounds. It will be further noted that while acetylacetone is sufficiently soluble in the aqueous solution enabling interaction between acetylacetone and the trivalent molybdenum ions therein, others of the beta-diketone family are less soluble in the aqueous solution in which case compatible and inert solvents such as alcohol may additionally be employed forming binary and ternary aqueous reaction mixtures to facilitate solution of the less aqueous soluble beta-diketone compounds.

The method comprising the present invention relies on the discovery that beta-diketone compounds will readily react with trivalent molybdenum ions in an aqueous medium of controlled composition from which a precipitate of the appropriate or mixed molybdenum beta-diketone complex can be readily isolated. The aqueous medium containing the trivalent molybdenum ion can be prepared by dissolving a selected trivalent molybdenum compound in the solution or alternatively, electrolytically reducing a hexavalent molybdenum ion to the trivalent state forming an aqueous solution containing the requisite concentration of trivalent molybdenum ions.

Trivalent molybdenum compounds suitable for use as starting materials which can be dissolved directly in an aqueous solution for reaction with a beta-diketone compound include alkali molybdenum (III) hexahalides wherein the term "alkali" is employed in its broad sense to include the alkali metals including lithium, sodium, and potassium as well as ammonium and wherein the halide constituent includes chlorine and bromine as well as mixtures thereof. A typical compound of this type is potassium hexachloromolybdate (III), $K_3MoCl_6$. Corresponding compounds containing the halogens fluorine and iodine are impractical for providing a commercially suitable process.

The formation of an aqueous solution containing reactive trivalent molybdenum ions can also be prepared by forming an acid solution of hexavalent molybdenum compounds selected from the group consisting of molybdic oxide, $MoO_3$; alkali metal molybdates wherein the alkali metal includes lithium, sodium, potassium and ammonium such as, for example, sodium molybdate, $Na_2MoO_4$; and alkali paramolybdates such as ammonium paramolybdate, $(NH_4)_6H_8Mo_7O_{28}$. The aqueous acid solution containing the dissolved hexavalent molybdenum compound of the aforementioned type comprises the catholyte whereas an anolyte formed of a concentrated aqueous acid solution is employed in a diaphragm-type electrolytic cell for effecting at least a partial reduction of the hexavalent molybdenum ion to the trivalent state in response to the passage of current through the solution. After an appreciable quantity of trivalent molybdenum ions is formed in the solution, the desired beta-diketone compound or mixture of beta-diketone compounds can be added to the aqueous acidic solution which on subsequent neutralization employing a suitable base such as potassium hydroxide, sodium hydroxide, and preferably ammonium hydroxide effects a precipitation of the molybdenum (III) beta-diketone complex. The precipitate can readily be isolated by filtration and subsequently washed to remove the impurities therefrom and may be further purified by recrystallization if desired.

In each case, regardless of whether the trivalent molybdenum ion is introduced in the solution by way of a trivalent molybdenum compound or as a result of the electrolytic reduction of a higher valent molybdenum compound, the reaction of the beta-diketone compound occurs in substantially the same manner. Since the molybdenum (III) beta-diketone complex formed stoichiometrically requires 3 moles of the beta-diketone compound per gram atom of the trivalent molybdenum ion present, it is preferred in order to facilitate a substantially complete reaction of the beta-diketone compounds with the molybdenum ion to employ the beta-diketone compound in amounts preferably in excess of that theoretically required. By so doing, substantially high yields of product are obtained.

The method will now be described with particular reference to the formation of molybdenum (III) acetylacetonate produced by the co-reaction between trivalent molybdenum ions and acetylacetone. Molybdenum (III) acetylacetonate, tris (2,4 - pentanedione) molybdenum (III), $Mo(C_5H_7O_2)_3$ is a dark-purple crystalline solid which has a melting point of about 228–229° C., is sublimable and thermally decomposes when heated above its melting point. Molybdenum (III) acetylacetonate is monomeric in boiling benzene and is nonreactive toward Lewis bases (water, benzophenone, pyridine and triphenylphosphine). Since the reaction product molybdenum (III) acetylacetonate is subjected to oxidation attack, the synthesis of this compound must be conducted under an inert atmosphere such as nitrogen, for example, and subsequent separation, material transfers, purification, and characterization of the product must likewise be made under an inert atmosphere.

In accordance with one embodiment of the method comprising the present invention, an aqueous solution is prepared by dissolving an alkali metal hexahalogenmolybdate compound and an excess quantity of a beta-diketone compound, specifically acetylacetone in water. The water employed for forming the aqueous solution of the reaction constituents as well as the water employed for washing the resultant product, should be substantially devoid of any dissolved oxygen which would otherwise react with the molybdenum (III) acetylacetonate formed producing molybdenyl acetylacetonate or other intermediate oxidation reaction products. Water which has been distilled and de-aerated by any one of the techniques well known in the art can be satisfactorily employed for this purpose.

The reaction of the constituents in the aqueous solution can conventionally take place at a temperature ranging from about 0° C. up to about 100° C. and preferably at a temperature ranging from about 40° C. to about 60° C. Increased solubility of the reacting constituents is achieved when the temperature of the solution is increased and the rate of reaction between the constituents is also increased as the temperature of the liquid reaction medium is increased within the aforesaid ranges. Temperatures in excess of about 100° C. are less desirable because of a tendency of the alkali metal hexahalogenmolybdate (III) compound to be hydrolyzed. On the other hand temperatures below about 0° C. can also be employed but are less satisfactory due to the relatively slow rate of solution of the reacting constituents and the reduced rate of interaction therebetween. It is for this reason that the solution should be maintained within the temperature range of from about 0° C. to about 100° C., and preferably within about 40° C. and about 60° C.

The concentration of the reacting constituents as hereinbefore mentioned, should be controlled so as to provide an aqueous solution which is substantially saturated with the beta-diketone compound, specifically acetylacetone and which is present in an amount in excess of the theoretical amount required for the formation of molydenum (III) acetylacetone. A control of the concentration of the beta-diketone constituents in an amount ranging from about 1.5 up to about 4 times the theoretical amount required has provided sufficiently rapid reaction conditions and yields of the molybdenum (III) beta-diketone complex within commercially satisfactory amounts.

In order to more fully describe the method comprising the present invention as hereinbefore set forth, the following example is provided. It will be understood that the example is presented for the purposes of further illustration and is not intended to be limiting of this invention as set forth in the subjoined claims.

Example 1

An aqueous solution was prepared comprising 500 milliliters (ml.) of de-aerated distilled water at 50° C. in which 50 ml. (48.8 gm.) (0.49 mole) of acetylacetone were dissolved. The acetylacetone (2,4-pentanedione) was of a pure grade as confirmed by chromatographic analysis. After a slight cooling of the aqueous solution, 20 gm. (0.048 mole) of potassium hexachloromolybdate (III) were added and complete solution thereof was achieved by stirring for a short period of time. The resultant solution was thereafter heated gradually to a temperature of 50° C. over a 20-minute period and maintained at a temperature of between 50° C. to 55° C. for a period of 1 hour.

During this time, interreaction between the acetylacetone and potassium hexachloromolybdate (III) occurred, which was evidenced by the formation of a dark-purple crystalline solid precipitate. At the completion of the 1-hour reaction period, the reaction was substantially complete and the solid precipitate was separated by vacuum filtration and washed with de-aerated distilled water. The preparation of the solution, the reaction of the solution and the separation and filtration of the reaction products were conducted under a purified nitrogen atmosphere employing a nitrogen box. The solid crystalline filtered product was thereafter vacuum dried under a nitrogen atmosphere under gentle heating by an infrared lamp resulting in a yield of 16.7 gm. of dark-purple crystals comprising a theoretical yield of 89%.

Sampling for identification and classification of the reaction product as molybdenum (III) acetylacetonate was conducted under a pre-purified nitrogen atmosphere. The crystalline product had a melting point of 228–229° C. The calculated elemental composition of molybdenum (III) acetylacetonate based on the formula of $C_{15}H_{21}MoO_6$ was calculated as: C, 45.81; H, 5.38; Mo, 24.40. The elemental composition of the reaction product was found by analysis to be: C, 46.12; H, 5.65; Mo, 24.30. The molecular weight of molybdenum (III) acetylacetonate as calculated is 393.27. The molecular weight of the reaction product determined ebullioscopically in benzene was found to be 393.

The reaction product was also submitted to infrared spectrographic analysis employing a Perkin-Elmer model 21 instrument in which the sample was prepared as potassium bromide disk and a Nujol mull in a nitrogen atmosphere and run in a sealed cell. The infrared absorption spectrum obtained had the following distinct peaks in the 1650–750 cm.$^{-1}$ region; a strong shoulder at 1550; a strong peak at 1527; a medium peak at 1429; a strong peak at 1370; a strong peak at 1274; a weak absorption at 1193; a medium peak at 1020; a medium peak at 930; and a medium peak at 778. The absorption spectrum obtained corresponds to those obtained for acetylacetonates of the trivalent metal ions. The foregoing analytical data obtained on the reaction product synthesized in accordance with Example 1, clearly establish its identity as molybdenum (III) acetylacetonate.

A modification of the method as set forth in Example 1, which constitutes a preferred method of synthesizing molybdenum (III) acetylacetonate is set forth in the following example:

Example 2

This method is similar to that disclosed in Example 1 but deviates therefrom in that a basic aqueous solution is employed in which the acetylacetone is dissolved. Any suitable alkali hydroxide can be satisfactorily employed including lithium hydroxide, sodium hydroxide, potassium hydroxide, and ammonium hydroxide of which the latter constitutes the preferred material. The use of a basic aqueous solution effects a reaction of the acetylacetone with the alkali constituent forming a compound having greater water solubility enabling higher concentrations of acetylacetone to be employed while simultaneously achieving higher yields of product per unit volume of the reaction vessel. This method further enables the attainment of high theoretical yields of the molybdenum (III) acetylacetonate even when using only a 50% mole excess of acetylacetone. The greater efficiency in equipment utilization provided by this method makes it particularly applicable for economical commercial production of the molybdenum complex.

In accordance with the preferred method, an aqueous solution was prepared comprising 1000 ml. of water and 50 ml. 15 N (0.75 mole) ammonium hydroxide ($NH_4OH$) to which 184 grams (1.84 moles) acetylacetone was added. The solution was de-aerated by bubbling nitrogen through an extra-coarse glass frit. The resultant solution was of a clear light yellow color. The quantity of ammonium hydroxide employed was sufficient to convert a portion of the acetylacetone to ammonium acetylacetone which is substantially more soluble in water than acetylacetone itself. The aqueous solution had a pH of about 8. Thereafter, 131 grams (0.305 mole) of potassium hexachloromolybdate (III) were added and the resultant reaction mixture was heated to about 50° C. over a 40–60 minute period and then held at a temperature ranging from 55–60° C. for a period of 1½ to 2 hours. After standing overnight at room temperature, the reaction product was isolated from the reaction solution by filtration and the product was washed with de-aerated, distilled water and vacuum dried. The resultant pure product weighed 109 grams representing a 91.2% yield and had a melting point of 225.5–227° C. Infrared absorption spectrum obtained on the product revealed no spurious peaks indicating a substantially pure product.

In accordance with the technique as hereinbefore described in Example 2, the trivalent molybdenum salt is added to the aqueous solution containing the beta-diketone and alkali hydroxide. It is also contemplated in accordance with the practice of the present invention to first form an aqueous solution containing trivalent molybdenum ions by dissolving a trivalent molybdenum salt such as potassium hexachloromolybdate (III), for example, or as derived from the electrolytic reduction of higher valent molybdenum compounds to which the aquous solution containing the beta-diketone and alkali hydroxide is added gradually such as by dropwise addition effecting the formation of the molybdenum beta-diketone complex.

In either event, when an alkali hydroxide is employed for forming an alkali beta-diketone compound, in accordance with the preferred practice of the present invention, the mole ratio of alkali hydroxide to the beta-diketone compound is controlled so as to be less than 1 or, in accordance with the stoichiometry of the reaction the mole ratio of alkali hydroxide to trivalent molybdenum is controlled so as never to exceed 3 to 1. In accordance with the foregoing an excess of the beta-diketone compound relative to the alkali hydroxide is present. It is conventionally preferred to employ ratios between the reaction constituents wherein the beta-diketone compound is present in an amount ranging from about 3.5 to about 6 moles per mole of trivalent molybdenum and the alkali hydroxide is present in an amount ranging from about 1 mole up to 3 moles per mole of trivalent molybdenum.

Example 3

An aqueous catholyte was prepared by dissolving 45 gm. of ammonium paramolybdate (0.256 gm. atom molybdenum) in 150 ml. 8 N hydrochloric acid. The catholyte was poured into a sealed diaphragm cell provided with a mercury pool cathode. A porous alumina crucible comprised the anode compartment containing a carbon rod anode which was filled with concentrated hydrochloric acid anolyte and the exterior of which crucible was immersed in the catholyte. The porosity of the alumina crucible was selected so as to allow the flow of electric current without any gross diffusion of the dissolved molecules.

The interior of the anode compartment of the electrolytic cell was vented to the atmosphere to allow the chlorine gas formed to escape to the atmosphere. The interior of the cathode compartment was sealed under a blanket of nitrogen to avoid entry of any oxygen which would occasion oxidation attack of the molybdenum (III) acetylacetonate subsequently formed.

A current potential was supplied across the anode and cathode of the electrolytic cell maintaining a cathode current density of from 0.041 to 0.055 ampere per square centimeter for a period of time to provide a total current consumption of about 28.1 ampere-hours which comprise about 30% excess of the theoretical current required. At the completion of the electrolytic reduction of the hexavalent molybdenum in the catholyte solution, the solution turned to a dark reddish-brown solution to which was added 34.1 gm. (0.34 mole) of acetylacetone. The resultant reaction mixture was thereafter agitated and was slowly neutralized to a pH within 6–7 by the slow dropwise addition of aqueous ammonium hydroxide. The reaction mixture was thereafter heated to a temperature of about 50° C. over a 30-minute period and maintained at that temperature for a period of about 45 minutes. During this period, a reddish solid precipitate was formed which was subsequently isolated from the reaction mixture by filtration and was washed with de-aerated water.

The molybdenum (III) acetylacetonate was thereafter purified by vacuum sublimation (0.07 mm., 170° C.–180° C.) for 11½ hours to obtain 11.7 gm. (11.7% yield based upon molybdenum) of dark-red-purple sublimate having a melting point of 223–225° C. The infrared absorption spectrum of this product corresponded essentially to that of the molybdenum (III) acetylacetonate derived from the method as set forth in Example 1.

The relatively low yield of only 11.7% of molybdenum (III) acetylacetonate in accordance with the method as disclosed in Example 3, is due to the lack of sufficient acetylacetone, which was present in an amount of only 1.3 moles whereas as hereinbefore set forth the reaction stoichiometry requires three molecular equivalents. It will be noted, however, that in spite of the less than theoretical quantity of acetylacetone employed, an appreciable yield of molybdenum (III) acetylacetonate was obtained demonstrating the facility by which this compound is formed in accordance with the method comprising the present invention.

While it will be apparent that the embodiments of the invention herein disclosed are well calculated to fulfill the objects of the invention, it will be appreciated that the invention is susceptible to modification, variation, and change without departing from the proper scope or fair meaning of the subjoined claims.

What is claimed is:

1. The method of making molybdenum (III) acetylacetonate which comprises the steps of interreacting an alkali hydroxide selected from the group consisting of potassium hydroxide, lithium hydroxide, sodium hydroxide, ammonium hydroxide, and mixtures thereof with acetylacetone in an aqueous solution in which the mole ratio of said alkali hydroxide to said acetylacetone is controlled to a level less than one to convert a portion of said acetylacetone to an alkali acetylacetone compound, interreacting trivalent molybdenum ions with said aqueous solution in an amount to provide a concentration of about one atom equivalent of molybdenum for about 3.5 to about 6 moles acetylacetone and about 1 up to 3 moles of said alkali hydroxide present, and thereafter isolating the molybdenum (III) acetylacetonate from the solution.

2. The method as defined in claim 1, wherein said alkali hydroxide is ammonium hydroxide.

3. The method as defined in claim 1, wherein said trivalent molybdenum ions are directly introduced into said solution by dissolving a trivalent molybdenum salt therein.

4. The method as defined in claim 1, wherein said solution containing said alkali acetylacetone compound is added to a second aqueous solution containing said trivalent molybdenum ions to effect interreaction therebetween.

5. The method as defined in claim 3, wherein said trivalent molybdenum salt is potassium hexachloromolybdate (III).

6. The method as defined in claim 4, wherein said second solution of trivalent molybdenum ions is derived from the electrolytic reduction of higher valent molybdenum compounds.

References Cited

Larson et al. (II): Am. Chem. Soc., Abstract of Papers, 142nd meeting, 1962, Section N, p. 25.

TOBIAS E. LEVOW, *Primary Examiner.*

A. P. DEMERS, *Assistant Examiner.*

U.S. Cl. X.R.

252—431